(12) United States Patent
Isobe et al.

(10) Patent No.: US 10,257,379 B2
(45) Date of Patent: Apr. 9, 2019

(54) INFORMATION PROCESSING DEVICE, PORTABLE TERMINAL, CONTROL DEVICE, AND NON-TRANSITORY COMPUTER READABLE MEDIUM

(71) Applicant: FUJI XEROX CO., LTD., Tokyo (JP)

(72) Inventors: Kimihiko Isobe, Kanagawa (JP); Junichi Horii, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/592,635

(22) Filed: May 11, 2017

(65) Prior Publication Data

US 2018/0054544 A1 Feb. 22, 2018

(30) Foreign Application Priority Data

Aug. 17, 2016 (JP) .................................. 2016-160219
Aug. 25, 2016 (JP) .................................. 2016-164982

(51) Int. Cl.
*G06F 15/00* (2006.01)
*H04N 1/32* (2006.01)
(Continued)

(52) U.S. Cl.
CPC ......... *H04N 1/32651* (2013.01); *G06F 3/121* (2013.01); *G06F 3/1204* (2013.01); *G06F 3/1205* (2013.01); *G06F 3/1234* (2013.01); *G06F 3/1281* (2013.01); *G06F 3/1282* (2013.01); *G06F 3/1294* (2013.01); *H04N 1/00005* (2013.01); *H04N 1/00246* (2013.01); *H04N 1/00251* (2013.01); *H04N 1/00336* (2013.01); *H04N 1/00506* (2013.01); *H04N 1/00665* (2013.01); *H04N 2201/0006* (2013.01); *H04N 2201/0068* (2013.01); *H04N 2201/0072* (2013.01); *H04N 2201/0082* (2013.01);
(Continued)

(58) Field of Classification Search
CPC ........... H04N 1/32651; H04N 1/00506; H04N 1/00005; H04N 1/00336; G06F 3/121; G06F 3/1204; G06F 3/1281; G06F 3/1234; G06F 3/1205; G06F 3/1294; G06F 3/1282
USPC ........................................................ 358/1.14
See application file for complete search history.

(56) References Cited

U.S. PATENT DOCUMENTS 9,781,297 B2 * 10/2017 Zhao ................... H04N 1/00106
2012/0194859 A1 * 8/2012 Oda .................... H04N 1/00323
358/1.15

(Continued)

FOREIGN PATENT DOCUMENTS

JP 2002-31987 A 1/2002
JP 2009-137118 A 6/2009
(Continued)

*Primary Examiner* — Saeid Ebrahimi Dehkordy
(74) *Attorney, Agent, or Firm* — Oliff PLC (57) ABSTRACT

An information processing device includes a retaining unit and an image display. The retaining unit retains image-formation-related information of an image forming apparatus that forms an image. The image display causes a display section of a portable terminal having the display section and an image capturing section to display an image for assisting with an operation of the image forming apparatus based on a captured image result of the image capturing section and the image-formation-related information retained in the retaining unit.

8 Claims, 9 Drawing Sheets

(51) Int. Cl.
*H04N 1/00* (2006.01)
*G06F 3/12* (2006.01)

(52) U.S. Cl.
CPC ............. *H04N 2201/0096* (2013.01); *H04N 2201/3219* (2013.01); *H04N 2201/3269* (2013.01); *H04N 2201/3284* (2013.01)

(56) References Cited

U.S. PATENT DOCUMENTS

| | | |
|---|---|---|
| 2015/0095848 A1 | 4/2015 | Sugimoto |
| 2015/0281511 A1 | 10/2015 | Furutani |
| 2017/0223220 A1* | 8/2017 | Zhao ................. H04N 1/00106 |
| 2017/0315758 A1* | 11/2017 | Tsutsumi ............. G06F 3/1204 |

FOREIGN PATENT DOCUMENTS

| | | |
|---|---|---|
| JP | 2015-069273 A | 4/2015 |
| JP | 2015-186208 A | 10/2015 |

* cited by examiner

B STATUS: xxx
D STATUS: xxx
A COUNTER: xxx
B ERROR: xxx
E ERROR: xxx

INFORMATION PROCESSING DEVICE, PORTABLE TERMINAL, CONTROL DEVICE, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-160219 filed Aug. 17, 2016 and Japanese Patent Application No. 2016-164982 filed Aug. 25, 2016.

BACKGROUND

Technical Field

The present invention relates to information processing devices, mobile terminals, control devices, and non-transitory computer readable media.

SUMMARY

According to an aspect of the invention, there is provided an information processing device including a retaining unit and an image display. The retaining unit retains image-formation-related information of an image forming apparatus that forms an image. The image display causes a display section of a portable terminal having the display section and an image capturing section to display an image for assisting with an operation of the image forming apparatus based on a captured image result of the image capturing section and the image-formation-related information retained in the retaining unit.

BRIEF DESCRIPTION OF THE DRAWINGS

An exemplary embodiment of the present invention will be described in detail based on the following figures, wherein.

DETAILED DESCRIPTION

An exemplary embodiment of the present invention will be described below with reference to the appended drawings.

Configuration of Image Forming System

Figure 1:
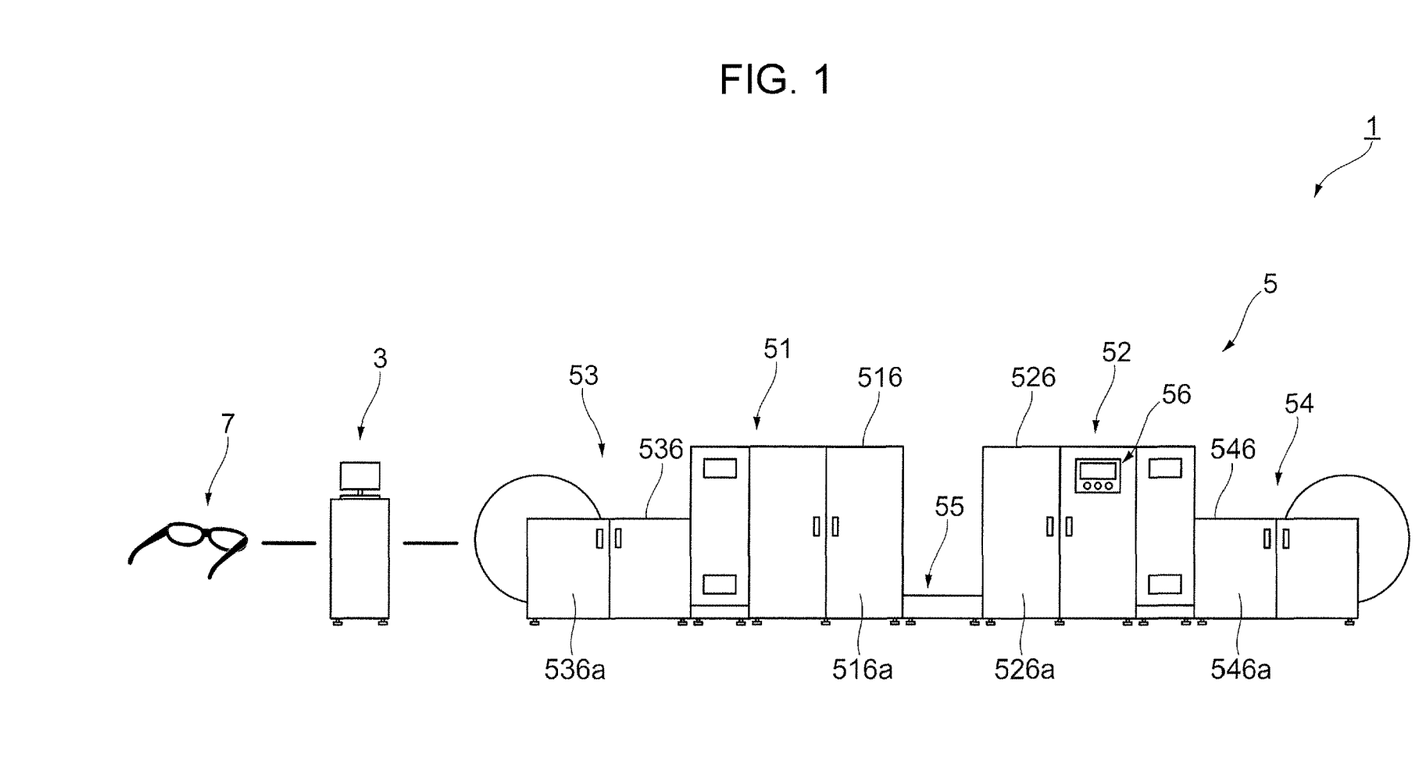
FIG. 1 illustrates an example of the overall configuration of an image forming system according to an exemplary embodiment.

FIG. 1 illustrates an example of the overall configuration of an image forming system 1 according to an exemplary embodiment.

As shown in FIG. 1, the image forming system 1 according to this exemplary embodiment includes a print server 3 that manages, for example, a print job, which is a process based on a print command (i.e., output command), and an image forming apparatus 5 that serves as an example of a target object to be operated by an operator and that executes a printing process (i.e., image forming process) on continuous paper S under the control of the print server 3. The image forming system 1 also includes a wearable terminal 7 that is used by being worn by the operator who performs various types of operations on the image forming apparatus 5 and that serves as an example of a portable terminal displaying, for example, an operational assistance image for assisting with the various types of operations performed by the operator.

In the image forming system 1, the print server 3, the image forming apparatus 5, and the wearable terminal 7 are connected to one another in a communicable manner via, for example, a wireless communication line.

Configuration of Image Forming Apparatus

Figure 2:
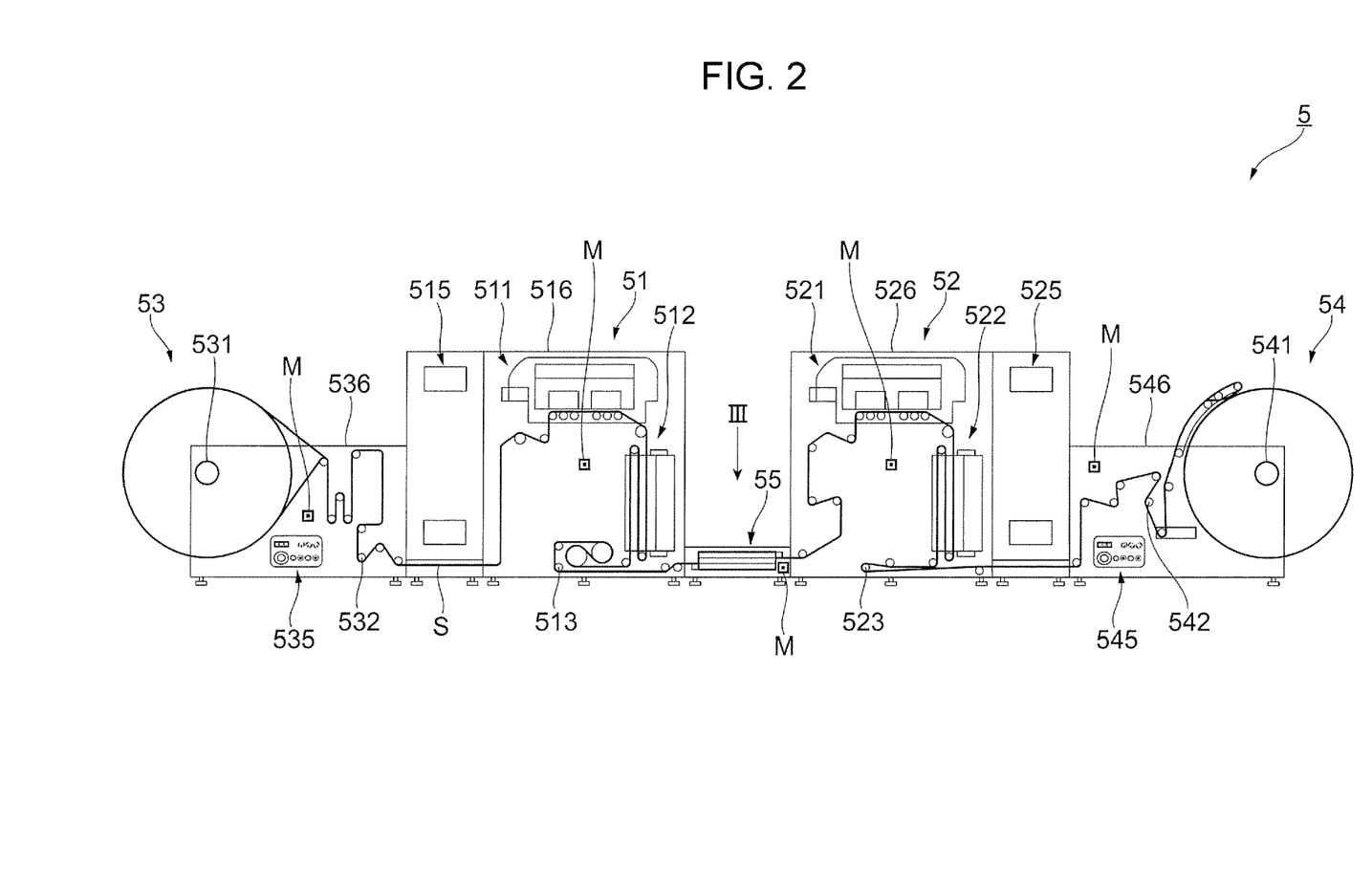
FIG. 2 illustrates the internal structure of an image forming apparatus according to this exemplary embodiment.

FIG. 2 illustrates the internal structure of the image forming apparatus 5 according to this exemplary embodiment. The image forming apparatus 5 according to this exemplary embodiment forms an image onto the transported continuous paper S. In the image forming apparatus 5 according to this exemplary embodiment, the continuous paper S is transported at a high speed of, for example, about 100 meters per minute so as to allow for high-speed printing of several thousands of pages per minute. The continuous paper S in this exemplary embodiment refers to paper that is continuous in the transport direction in the image forming apparatus 5. The continuous paper S may be, for example, perforated or folded so long as it is continuous in the transport direction.

As shown in FIGS. 1 and 2, the image forming apparatus 5 is a combination of multiple devices. Specifically, the image forming apparatus 5 includes a first image forming device 51 that forms an image onto one face of the continuous paper S and a second image forming device 52 that forms an image onto one face or the other face of the continuous paper S on which the image is formed by the first image forming device 51. The image forming apparatus 5 also includes a paper feeding device 53 that feeds the continuous paper S to the first image forming device 51 and a collecting device 54 that collects the continuous paper S by winding it up after the image is formed thereon by the second image forming device 52. Furthermore, the image forming apparatus 5 includes an inverting device 55 that inverts the front and rear faces of the continuous paper S, where appropriate, having the image formed thereon by the first image forming device 51 and transports the continuous paper S to the second image forming device 52. Moreover, the image forming apparatus 5 includes multiple relay units (not shown) that relay between the paper feeding device 53 and the first image forming device 51, between the first image forming device 51 and the inverting device 55, between the inverting device 55 and the second image forming device 52, and between the second image forming device 52 and the collecting device 54.

The image forming apparatus 5 includes a display panel 56 (see FIG. 1) that receives an operation input by the operator and displays information to the operator, and also includes a controller 60 (see FIG. 5 to be described later) as an example of a control device that controls the operation of each device in the image forming apparatus 5 and that communicates with the print server 3.

As shown in FIGS. 1 and 2, the first image forming device 51 includes a first image forming unit 511 that forms an image onto one face of the transported continuous paper S and a first drying unit 512 that dries the continuous paper S having the image formed thereon by the first image forming unit 511. Furthermore, the first image forming device 51 includes multiple transport rollers 513 that transport the continuous paper S. Moreover, the first image forming device 51 includes an operation panel 515 that receives an operation when, for example, the operator loads the continuous paper S into the first image forming device 51. The first image forming device 51 also includes a housing 516 that accommodates, for example, the first image forming unit 511, the first drying unit 512, and the transport rollers 513. As shown in FIG. 1, the housing 516 has an openable-closable door 516a that may be opened by, for example, the operator when loading the continuous paper S.

The first image forming unit 511 forms an image onto the continuous paper S in accordance with a so-called inkjet method. Specifically, the first image forming unit 511 has an inkjet head (not shown) having multiple nozzles that eject ink therefrom as liquid droplets.

The first drying unit 512 heats the ink ejected on the continuous paper S by the first image forming unit 511 so as to dry the ink. Specifically, the first drying unit 512 includes a heater (not shown) that generates heat by being supplied with electricity.

The second image forming device 52 has a configuration similar to that of the first image forming device 51. Specifically, the second image forming device 52 includes a second image forming unit 521 that has an inkjet head and that forms an image onto the continuous paper S in accordance with the so-called inkjet method, and also includes a second drying unit 522 that heats ink ejected on the continuous paper S by the second image forming unit 521 so as to dry the ink. The second image forming device 52 also includes multiple transport rollers 523 that transport the continuous paper S. Furthermore, the second image forming device 52 includes an operation panel 525 that receives an operation when, for example, the operator loads the continuous paper S into the second image forming device 52. The second image forming device 52 also includes a housing 526 that has an openable-closable door 526a and that accommodates, for example, the second image forming unit 521, the second drying unit 522, and the transport rollers 523.

The paper feeding device 53 feeds the roll-wound continuous paper S to the first image forming device 51 via a replay unit while unwinding the continuous paper S. The paper feeding device 53 includes a rotatable roller member 531 that supports the roll-wound continuous paper S and also includes multiple transport rollers 532 that transport the continuous paper S unwound from the roller member 531 toward the first image forming device 51. Furthermore, the paper feeding device 53 includes an operation panel 535 that receives an operation performed by the operator when feeding the continuous paper S. Moreover, the paper feeding device 53 also includes a housing 536 that has an openable-closable door 536a and that accommodates the roller member 531, the transport rollers 532, and the continuous paper S supported by the roller member 531.

The collecting device 54 collects the continuous paper S having the image formed thereon by the second image forming device 52 while winding up the continuous paper S into the shape of a roll. Specifically, the collecting device 54 includes a rotatable roller member 541 that winds up the continuous paper S into the shape of a roll and also includes multiple transport rollers 542 that transport the continuous paper S released from the second image forming device 52 toward the roller member 541. Furthermore, the collecting device 54 includes an operation panel 545 that receives an operation when the operator loads the continuous paper S into the collecting device 54. Moreover, the collecting device 54 also includes a housing 546 that has an openable-closable door 546a and that accommodates the roller member 541, the transport rollers 542, and the continuous paper S supported by the roller member 541.

In the image forming apparatus 5 according to this exemplary embodiment, the paper feeding device 53 feeds the roll-wound continuous paper S while unwinding it, and the collecting device 54 collects the continuous paper S while winding it up into the shape of a roll. Alternatively, the type of continuous paper S is not limited to this. For example, continuous paper S accordion-folded along perforations may be fed while being unfolded by the paper feeding device 53, and may be collected while being accordion-folded along the perforations by the collecting device 54.

The inverting device 55 inverts the front and rear faces of the continuous paper S, where appropriate, having an image formed thereon by the first image forming device 51 and transports the continuous paper S to the second image forming device 52. The inverting device 55 includes multiple inverting rollers (i.e., a first inverting roller 551 to a fifth inverting roller 555, see FIG. 3 to be described below) that guide the continuous paper S.

Figure 3:
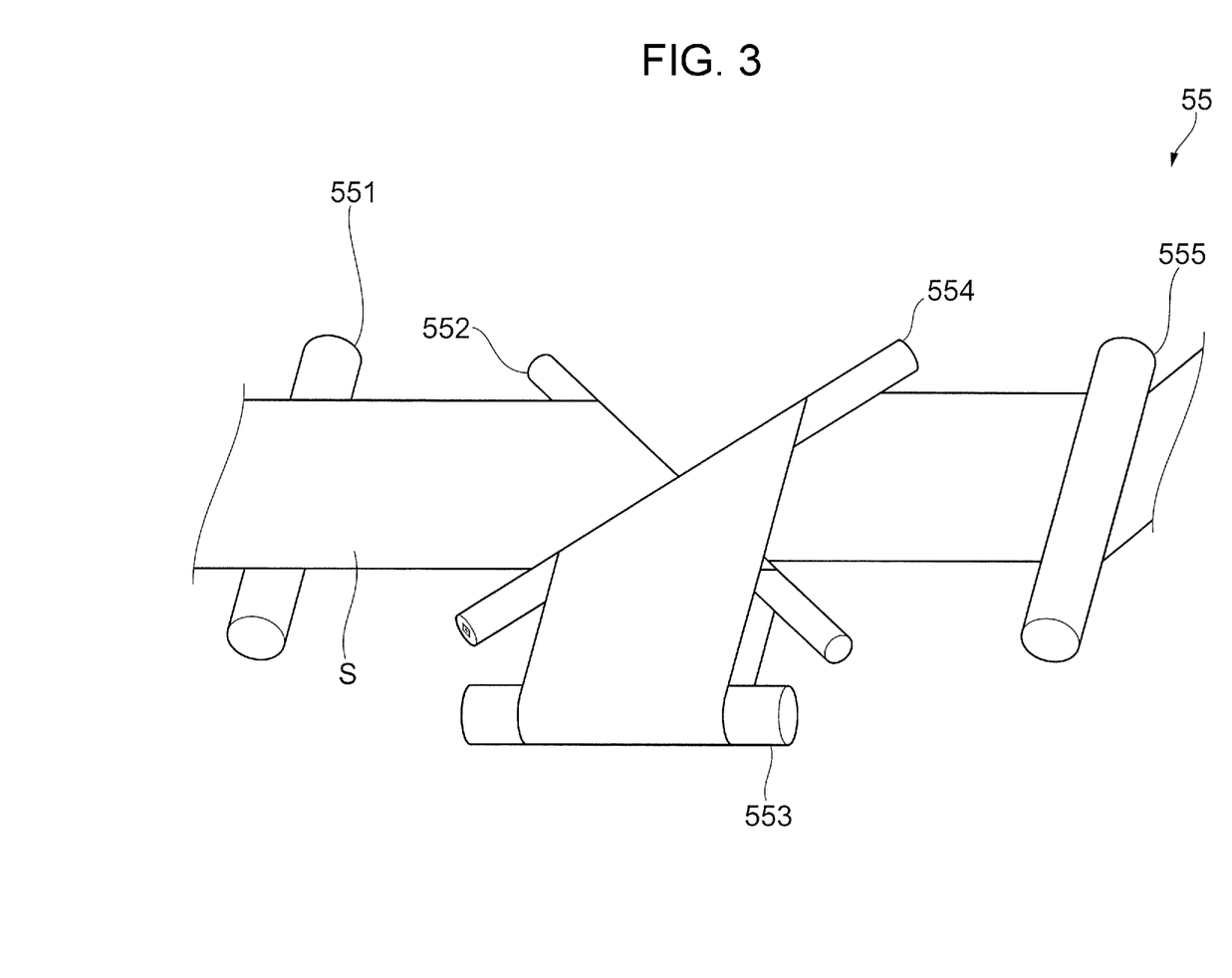
FIG. 3 illustrates the internal structure of an inverting device according to this exemplary embodiment, as viewed from the direction of arrow III shown in FIG. 2.

FIG. 3 illustrates the internal structure of the inverting device 55 according to this exemplary embodiment and corresponds to the diagram of the inverting device 55 shown in FIG. 2, as viewed from the direction of arrow III.

As described above, the inverting device 55 according to this exemplary embodiment includes five inverting rollers (i.e., the first inverting roller 551 to the fifth inverting roller 555) that guide the continuous paper S and that invert the front and rear faces of the continuous paper S, where appropriate. Specifically, the inverting device 55 includes the first inverting roller 551 that guides the continuous paper S released from the first image forming device 51 (see FIG. 1) toward the downstream side, and also includes the second inverting roller 552 around which the continuous paper S guided by the first inverting roller 551 is wound so as to change the traveling direction of the continuous paper S by 90°. Furthermore, the inverting device 55 includes the third inverting roller 553 around which the continuous paper S guided by the second inverting roller 552 is wound so as to change the traveling direction of the continuous paper S by 180°, and also includes the fourth inverting roller 554 around which the continuous paper S guided by the third inverting roller 553 is wound so as to change the traveling direction of the continuous paper S by 90°. Moreover, the inverting device 55 includes the fifth inverting roller 555 that transports the continuous paper S guided by the fourth inverting roller 554 toward the second image forming device 52 (see FIG. 2).

As shown in FIG. 2, in the image forming apparatus 5 according to this exemplary embodiment, the first image forming device 51, the second image forming device 52, the paper feeding device 53, the collecting device 54, and the inverting device 55 are each provided with a mark M that is visually recognizable at the wearable terminal 7 by the operator and that is used for specifying a region (unit) of the image forming apparatus 5.

In the image forming apparatus 5, the marks M are provided inside the housings of the individual devices. For example, in the first image forming device 51, a mark M attached to each unit is provided inside the housing 516. When the openable-closable door 516a of the housing 516 is opened, the marks M are exposed to the outside so as to be visually recognizable.

In the image forming system 1 according to this exemplary embodiment, a unit of the image forming apparatus 5 visually recognized by the operator is specified by detecting and analyzing an image of a mark M captured by an image capturing section 72 of the wearable terminal 7. Units of the image forming apparatus 5 in this exemplary embodiment refer to component units of the image forming apparatus 5 that are differentiated from one another based on the functions and positions thereof. For example, the units of the image forming apparatus 5 correspond to the first image forming device 51, the second image forming device 52, the paper feeding device 53, the collecting device 54, the inverting device 55, and the relay units.

Although a unit visually recognized through the wearable terminal 7 by the user is specified based on a unit included in an image captured by the image capturing section (i.e., based on an analysis result of the image captured by the image capturing section 72) in this example, the unit may be specified by another method. For example, an ID (identification information) may be given to each unit and be transmitted to the wearable terminal 7 by using Bluetooth (registered trademark) Low Energy (BLE), and the unit may be specified by reading the ID of the unit by using a sensor.

Configuration of Wearable Terminal

Figure 4:
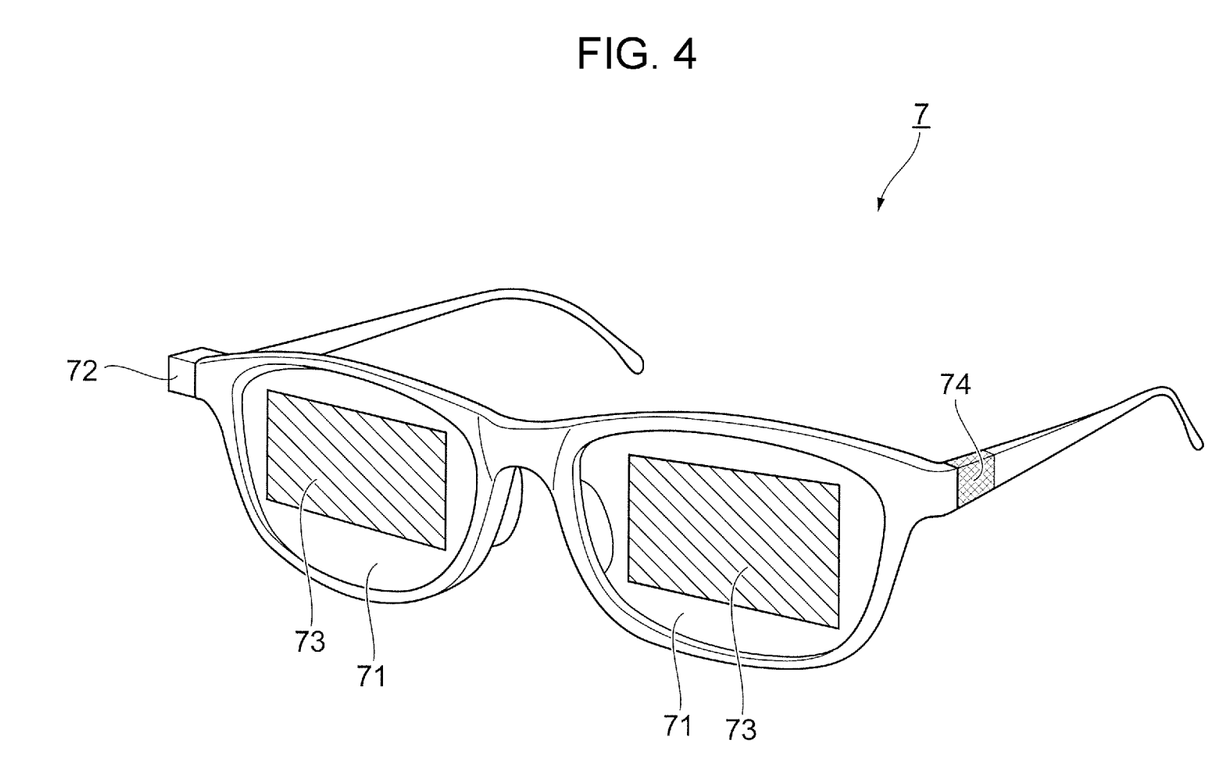
FIG. 4 schematically illustrates the configuration of a wearable terminal according to this exemplary embodiment.

FIG. 4 schematically illustrates the configuration of the wearable terminal 7 according to this exemplary embodiment. As shown in FIG. 4, the wearable terminal 7 according to this exemplary embodiment has the shape of eyeglasses in its entirety and is used by being worn on the head of the operator.

The wearable terminal 7 includes lens sections 71 provided at positions corresponding to the left and right eyes of the operator when worn, the image capturing section 72 that captures an image of an entire or partial region visually recognized through the lens sections 71 by the operator, and display sections 73 that display an image over the view visually recognized through the lens sections 71 by the operator. The wearable terminal 7 also includes an operation receiving section 74 that receives an operation performed by the operator. Furthermore, the wearable terminal 7 includes a controller 80 (see FIG. 5 to be described later) that controls each unit.

The image capturing region of the image capturing section 72 may be larger than the region visually recognized through the lens sections 71 by the operator so that a larger amount of information is acquired, or the image capturing region of the image capturing section 72 may be smaller than the region visually recognized through the lens sections 71 by the operator so that detailed information is acquired.

The lens sections 71 are composed of a material having optical transparency. Thus, the operator wearing the wearable terminal 7 may visually recognize the front view through the lens sections 71.

The image capturing section 72 is constituted of a compact camera, such as a charge coupled device (CCD) camera, and is provided adjacent to one of the lens sections 71 so as to be oriented in the direction of the line of vision of the operator wearing the wearable terminal 7. The image capturing section 72 captures a moving image of the view visually recognized through the lens sections 71 by the operator and outputs the captured moving image to the controller 80.

The display sections 73 are formed to overlap the lens sections 71 and are composed of a material having optical transparency when an image is not displayed thereon. Based on display control performed by the controller 80, the display sections 73 display an image over the view (i.e., actual image) visually recognized through the lens sections 71 by the operator.

The operation receiving section 74 is constituted of a microphone that receives sound released by the operator and receives various types of operations performed on the wearable terminal 7 based on the sound released by the operator.

Functional Configuration of Image Forming System

Figure 5:
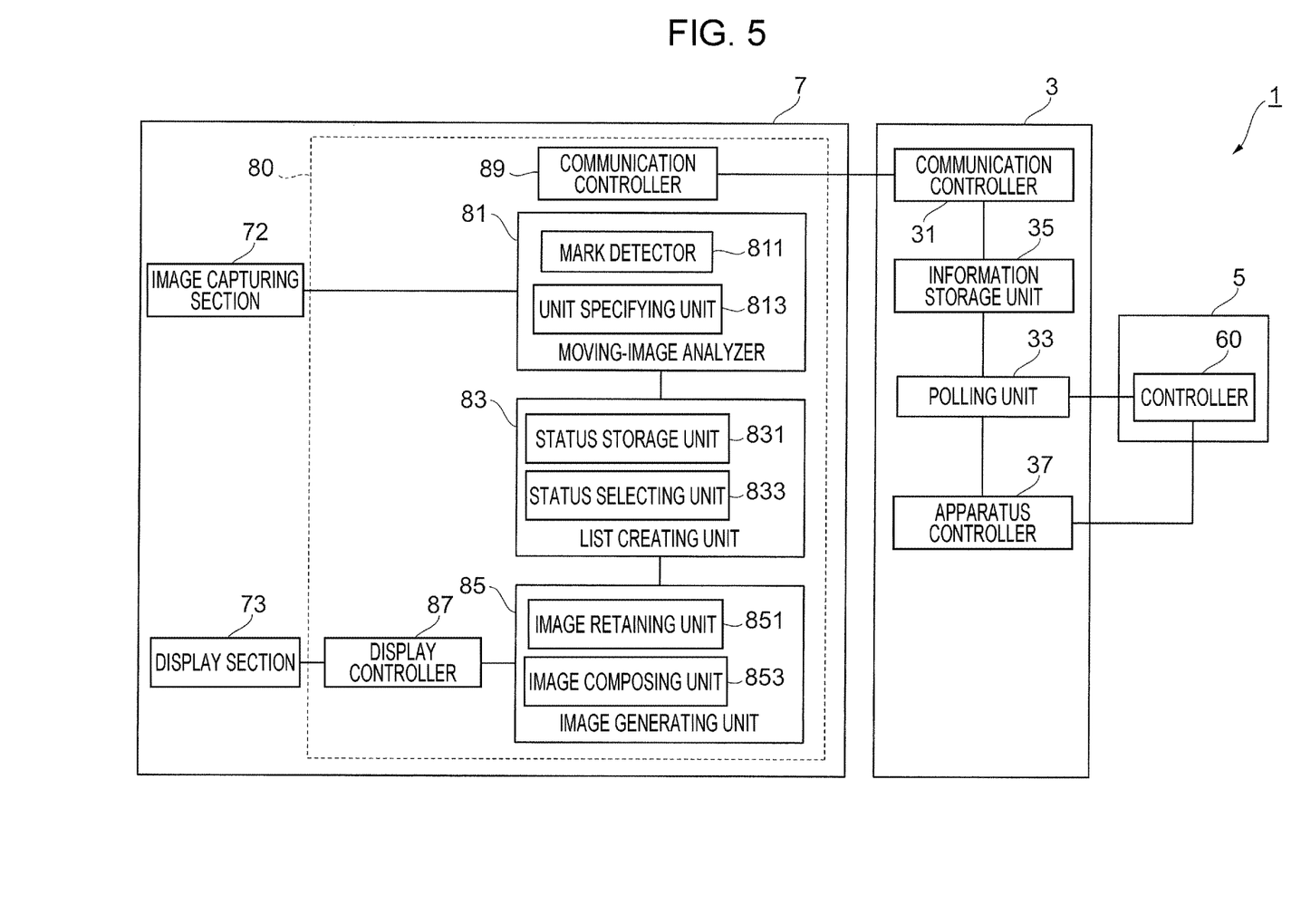
FIG. 5 is a block diagram illustrating a functional configuration of the image forming system according to this exemplary embodiment.

FIG. 5 is a block diagram illustrating a functional configuration of the image forming system 1 according to this exemplary embodiment.

As shown in FIG. 5, the print server 3 according to this exemplary embodiment includes a communication controller 31 that controls communication with the controller 80 of the wearable terminal 7 and the controller 60 of the image forming apparatus 5. Furthermore, the print server 3 includes a polling unit 33 as an example of an acquiring unit that executes a polling operation on the image forming apparatus 5 based on information acquired from the controller 80 of the wearable terminal 7 via the communication controller 31. Moreover, the print server 3 also includes an information storage unit 35 as an example of a retaining unit that stores, for example, information (i.e., device-status setting information, which will be described later) acquired as a result of the polling operation performed by the polling unit 33 and print-job-related information (i.e., operational information related to an image forming operation). Furthermore, the print server 3 includes an apparatus controller 37 that controls a printing operation performed in the image forming apparatus 5.

The communication controller 31 acquires an item list that is related to the device statuses in the image forming apparatus 5 and that is output from the controller 80 of the wearable terminal 7. Furthermore, the communication controller 31 outputs information, such as the device-status setting information acquired as a result of the polling operation performed by the polling unit 33, to the controller 80 of the wearable terminal 7. In the wearable terminal 7, an image is displayed on the display sections 73 based on the information output from the communication controller 31. This will be described in detail later. In other words, the communication controller 31 according to this exemplary embodiment functions as an image display that causes the display sections 73 of the wearable terminal 7 to display an image.

The polling unit 33 communicates with the controller 60 of the image forming apparatus 5 so as to sequentially acquire device-status-related setting information listed in the device-status-related item list.

The information storage unit 35 stores the device-status-related setting information acquired by the polling unit 33 and updates the setting information, where appropriate.

The apparatus controller 37 controls the printing operation in the image forming apparatus 5 based on a print job output by, for example, a client terminal (not shown).

The device statuses in the image forming apparatus 5 will be described later.

The controller 80 of the wearable terminal 7 includes a moving-image analyzer 81 that analyzes the moving image captured by the image capturing section 72. The controller 80 of the wearable terminal 7 includes a list creating unit 83 that creates an item list related to information (i.e., the device statuses to be described later) necessary for creating an image to be displayed on the display sections 73 based on the analysis result obtained by the moving-image analyzer 81. Moreover, the controller 80 of the wearable terminal 7 includes an image generating unit 85 that generates an assistance image for assisting the operator in operating each unit of the image forming apparatus 5. Furthermore, the wearable terminal 7 includes a display controller 87 that controls the display sections 73 so as to make the display sections 73 display the assistance image generated by the image generating unit 85. The controller 80 of the wearable terminal 7 also includes a communication controller 89 that controls communication with the print server 3.

The moving-image analyzer 81 has a mark detector 811 that detects a mark M included in the moving image, which is a captured image result, captured by the image capturing section 72 and a unit specifying unit 813 that specifies a unit of the image forming apparatus 5, which is image-captured by the image capturing section 72, based on the mark M detected by the mark detector 811.

The list creating unit 83 has a status storage unit 831 that stores information related to items of the statuses of the devices belonging to the image forming apparatus 5 (i.e., the statuses of units constituting the first image forming device 51, the second image forming device 52, the paper feeding device 53, the collecting device 54, and the inverting device 55 in this exemplary embodiment), and also has a status selecting unit 833 that selects a device status item related to a unit, which is specified by the unit specifying unit 813 of the moving-image analyzer 81, from device status items stored in the status storage unit 831 based on the specified unit.

The image generating unit 85 has an image retaining unit 851 that retains image data related to an assistance image for assisting with an operation of each unit of the image forming apparatus 5, and also has an image composing unit 853 that composes the image data retained in the image retaining unit 851 based on the device-status setting information output from the print server 3 so as to generate the assistance image related to the specified unit.

The display controller 87 causes the display sections 73 to display the assistance image generated by the image generating unit 85 over the view visually recognized through the lens sections 71 of the wearable terminal 7 by the operator.

The communication controller 89 outputs the device-status-related item list created by the list creating unit 83 to the print server 3. Moreover, the communication controller 89 acquires the device-status setting information output from the print server 3.

In the controller 80 according to this exemplary embodiment, the list creating unit 83 and the communication controller 89 constitute a requesting unit that requests the print server 3 to output the device-status setting information.

Because the image forming apparatus 5 is large in size in the image forming system 1 according to this exemplary embodiment, the path along which the continuous paper S is guided is long. For example, when loading the continuous paper S into the image forming apparatus 5, the operator has to perform this operation while moving around the image forming apparatus 5 instead of performing the operation at a single location. Moreover, because the image forming apparatus 5 has a complicated structure and the loading operation of the continuous paper S is also complicated, for example, there is a high possibility that an inexperienced operator may perform the operation erroneously.

Furthermore, the loading operation of the continuous paper S may vary depending on, for example, the settings of the image forming apparatus 5 or the print job to be performed in the image forming apparatus 5. However, it is difficult for the operator to constantly ascertain the settings of the image forming apparatus 5 or the print job to be performed in the image forming apparatus 5. Therefore, it is difficult for the operator to determine whether there is an error in the contents of the operation performed by the operator or an error in the operation. For example, there is a possibility that the image forming apparatus 5 may start performing an image forming operation in a state where there is an error in the loading operation of the continuous paper S. This is not desirable since the continuous paper S may be cut and the loading operation of the continuous paper S may have to be performed again in the image forming apparatus 5.

In contrast, in the image forming system 1 according to this exemplary embodiment, the display sections 73 of the wearable terminal 7 worn by the operator display information related to the operation for loading the continuous paper S into the image forming apparatus 5 and information related to the device settings set in the image forming apparatus 5 based on the information retained by the print server 3. Thus, the operator may perform the operation while referring to the information displayed on the display sections 73 of the wearable terminal 7, thereby reducing an erroneous operation.

A process performed in the image forming system 1 according to this exemplary embodiment will be described in detail below. The process performed in the image forming system 1 to be described below is realized as a result of software and hardware resources operating in cooperation with each other. Specifically, central processing units (CPUs) within control computers provided in the wearable terminal 7 and the print server 3 execute programs for realizing the functions of the wearable terminal 7 and the print server 3, so that these functions are realized.

Process in Wearable Terminal

Figure 6:
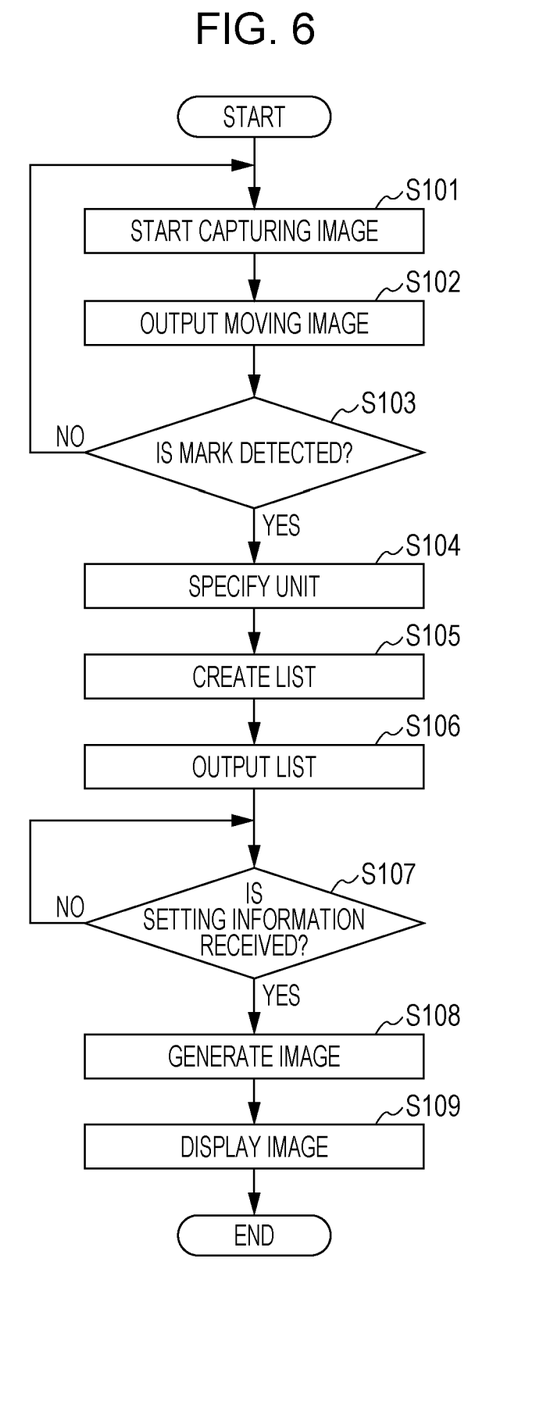
FIG. 6 is a flowchart illustrating a process performed by a controller of the wearable terminal according to this exemplary embodiment.

First, a process performed by the controller 80 of the wearable terminal 7 will be described. FIG. 6 is a flowchart illustrating the process performed by the controller 80 of the wearable terminal 7 according to this exemplary embodiment.

When the wearable terminal 7 is activated by the operator, the image capturing section 72 starts an image capturing process in step S101. As mentioned above, in the wearable terminal 7 according to this exemplary embodiment, an image of the view visually recognized through the lens sections 71 by the operator wearing the wearable terminal 7 is captured as a moving image by the image capturing section 72.

In step S102, the moving image captured by the image capturing section 72 is output to the moving-image analyzer 81.

In step S103, the mark detector 811 in the moving-image analyzer 81 detects a mark M from the moving image captured by the image capturing section 72. If a mark M is not detectable from the moving image (NO in step S103), the process returns to step S101 so as to continuously perform the image capturing process by the image capturing section 72, the output of the moving image, and the detection of a mark M.

If a mark M is detected by the mark detector 811 (YES in step S103), the unit specifying unit 813 specifies a unit of the image forming apparatus 5 included in the moving image captured by the image capturing section 72 in step S104 based on the detected mark M. Specifically, the mark M detected by the mark detector 811 is image-analyzed. Then, it is specified whether any of the units of the image forming apparatus 5 is included in the moving image captured by the image capturing section 72 based on the type (e.g., shape, color, and pattern) of the mark M. In this example, any of the first image forming device 51, the second image forming device 52, the paper feeding device 53, the collecting device 54, and the inverting device 55 is specified as a unit based on the type of the mark M.

Subsequently, in step S105, an item list related to device statuses in the image forming apparatus 5 with respect to the unit specified in step S104 is created by the list creating unit 83. The term "device statuses in the image forming apparatus 5" in this exemplary embodiment refers to information about the image forming apparatus 5 set with respect to the components constituting the image forming apparatus 5, the functions that the image forming apparatus 5 has, and conditions for a print job to be executed in the image forming apparatus 5. As mentioned above, the image forming apparatus 5 according to this exemplary embodiment is constituted of multiple devices (i.e., the first image forming device 51, the second image forming device 52, the paper feeding device 53, the collecting device 54, and the inverting device 55). Therefore, the image forming apparatus 5 according to this exemplary embodiment has a large number (e.g., about several thousands) of device statuses. Examples of device statuses in the image forming apparatus 5 include the temperatures and the rotational speeds of the individual components, the enabled/disabled statuses of functions of the components, and the size (width) of the continuous paper S in a print job, but are not limited thereto in particular.

In step S105, the list creating unit 83 selects a device status related to the unit specified in step S104 from among the multiple device statuses in the image forming apparatus 5 and creates a device-status-related item list. In other words, in step S105, the list is created by selecting a device status necessary for creating an assistance image related to the unit specified in step S104 from among the multiple device statuses in the image forming apparatus 5.

In step S106, the device-status-related item list created in step S105 is output to the print server 3 by the communication controller 89.

Upon acquiring the device-status-related item list from the controller 80 (i.e., the communication controller 89) of the wearable terminal 7, the print server 3 executes polling on the image forming apparatus 5 based on the device-status-related item list. This will be described in detail later. Thus, the print server 3 acquires setting information set with respect to the respective device statuses in the item list and outputs the acquired setting information to the controller 80 of the wearable terminal 7.

Then, in step S107, the communication controller 89 determines whether or not the device-status-related setting information output from the print server 3 is received. If the device-status-related setting information is not received (NO in step S107), the communication controller 89 waits until the device-status-related setting information is received.

If the device-status-related setting information is received (YES in step S107), the image generating unit 85 generates an image to be displayed on the display sections 73 in step S108 based on the received device-status-related setting information. In step S108, the image generating unit 85 generates an assistance image for assisting with an operation of the unit specified in step S102 based on the received device-status-related setting information. More specifically, based on the device-status-related setting information, image data related to the unit specified in step S102 is selected from the image data retained in the image retaining unit 851 of the image generating unit 85. Then, the image data is composed by the image composing unit 853 so that an assistance image is generated. Although a specific example of the assistance image will be described later, examples of the assistance image include a guide image P1 (see FIG. 8A to be described later) used as guidance for loading the continuous paper S in the specified unit and an image P2 (see FIG. 8A to be described later) related to setting information related to an operation of the unit.

In step S109, the display controller 87 causes the display sections 73 to display the image generated by the image generating unit 85.

Accordingly, the sequential process in the controller 80 of the wearable terminal 7 is completed.

Process in Print Server

Figure 7:
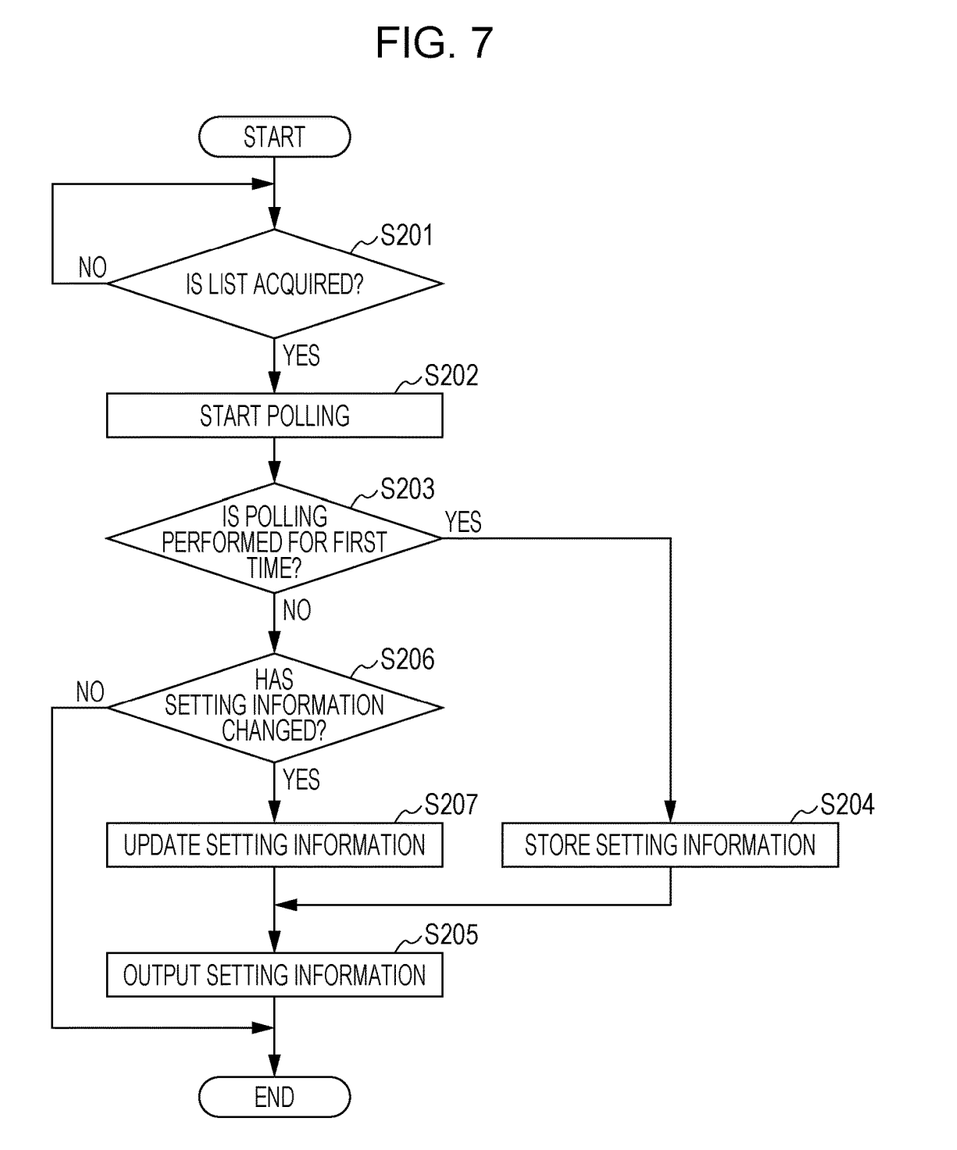
FIG. 7 is a flowchart illustrating a process performed by a print server according to this exemplary embodiment.

Next, a process performed by the print server 3 will be described. FIG. 7 is a flowchart illustrating the process performed by the print server 3 according to this exemplary embodiment.

First, in step S201, the print server 3 determines whether or not the device-status-related item list of the image forming apparatus 5 is acquired from the controller 80 of the wearable terminal 7 in step S106 described above.

If the device-status-related item list is acquired from the controller 80 of the wearable terminal 7 (YES in step S201), a polling operation on the image forming apparatus 5 commences in step S202 based on the acquired device-status-related item list.

Specifically, the polling unit 33 communicates with the controller 60 of the image forming apparatus 5 for a predetermined time period (e.g., several milliseconds). Then, the setting information set in the image forming apparatus 5 is sequentially acquired with respect to each of the device statuses in the device-status-related item list.

In step S203, it is determined whether or not the polling (i.e., the acquisition of the device-status-related setting information) by the polling unit 33 is performed for the first time.

If the acquisition of the device-status-related setting information by the polling unit 33 is performed for the first time (YES in step S203), the device-status-related setting information is stored into the information storage unit 35 in step S204. Then, in step S205, the communication controller 31 outputs the device-status-related setting information stored in the information storage unit 35 to the controller 80 of the wearable terminal 7.

If the acquisition of the device-status-related setting information by the polling unit 33 is performed for the second time or onward (NO in step S203), it is determined in step S206 whether or not the device-status-related setting information acquired in step S202 has changed from the device-status-related setting information acquired as a result of the previous polling operation and stored in the information storage unit 35.

Then, if the device-status-related setting information has changed (YES in step S206), the process proceeds to step S207 where the device-status-related setting information stored in the information storage unit 35 is updated to the device-status-related setting information newly acquired in step S202. Then, in step S205, the communication controller 31 outputs the updated device-status-related setting information to the controller 80 of the wearable terminal 7.

If the device-status-related setting information has not changed (NO in step S206), the updating and outputting of the device-status-related setting information are not performed, and the sequential process in the print server 3 ends.

Image Displayed on Display Sections

Figure 8A:
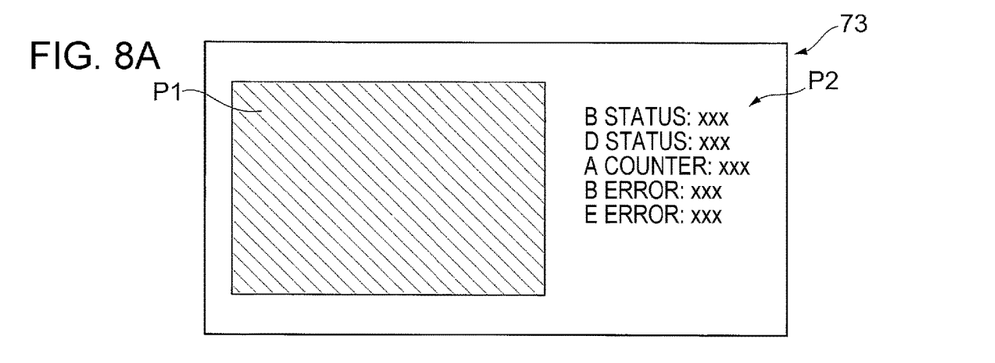
FIGS. 8A to 8C illustrate examples of assistance images displayed on display sections of the wearable terminal.
Figure 8B:
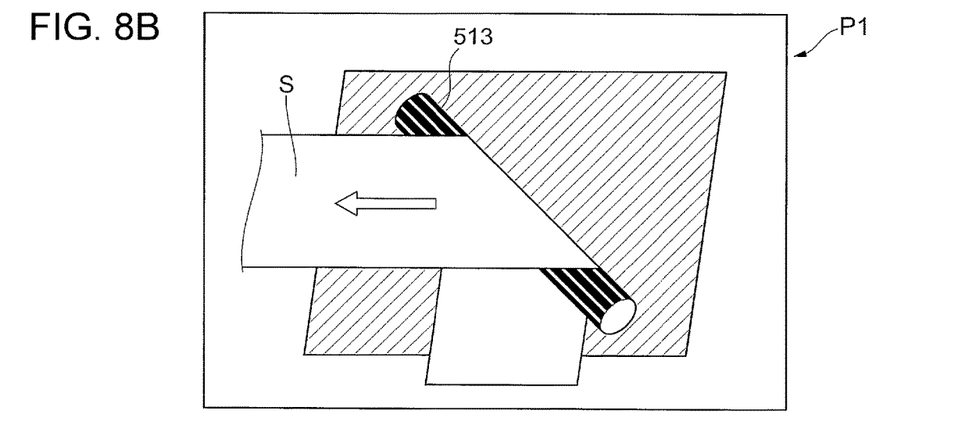
Figure 8C:
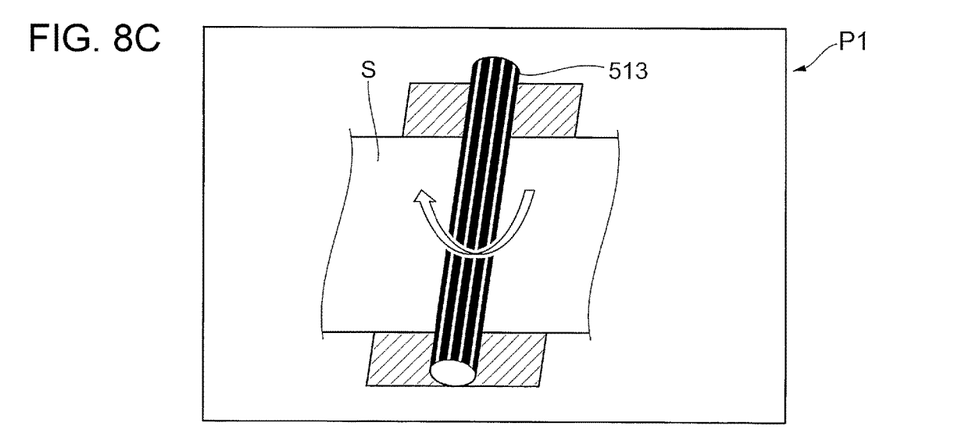

Next, an example of an assistance image displayed on the display sections 73 will be described. FIGS. 8A to 8C illustrate examples of assistance images displayed on the display sections 73 of the wearable terminal 7. Specifically, FIGS. 8A to 8C illustrate examples of assistance images generated by the image generating unit 85 in step S108 described above and displayed on the display sections 73 by the display controller 87 in step S109.

As shown in FIG. 8A, in this exemplary embodiment, the assistance images displayed include the guide image P1 used as guidance for an operation of the unit specified in step S102 and the image P2 of the setting information related to the operation of the unit included in the device-status-related setting information received in step S107.

Examples of the image P2 of the setting information related to the operation of the unit include information related to the settings of components constituting the unit, information related to enabled/disabled statuses of the functions that the unit has, and information with respect to the components constituting the unit and an error in the operation performed on the unit.

In this example, information related to B status, D status, A counter, B error, and E error is displayed as the setting information P2 related to the operation of the unit.

FIGS. 8B and 8C illustrate examples of guide images P1 displayed on the display sections 73. In this exemplary embodiment, different guide images P1 are composed in accordance with the device-status-related setting information received in step S107 described above. A composed guide image P1 is displayed in the display sections 73 over the view visually recognized through the lens sections 71 by the operator.

For example, in the image forming apparatus 5 according to this exemplary embodiment, the method of loading the continuous paper S to a roller member (e.g., the transport rollers 513 of the first image forming device 51, the transport rollers 523 of the second image forming device 52, and the inverting rollers 551 to 555 of the inverting device 55) varies depending on the width of the continuous paper S.

Therefore, in this exemplary embodiment, a different image is displayed as the guide image P1 used as guidance for loading the continuous paper S to the roller members (i.e., the transport roller 513 of the first image forming device 51 in this example) in accordance with information related to the width of the continuous paper S included in the device-status-related setting information received in step S107.

For example, in a case where setting information indicating that the width of the continuous paper S used in image formation is "half width" is received as the device-status-related setting information, the guide image P1 shown in FIG. 8B is displayed. Specifically, in the case where the width of the continuous paper S is the half width, the guide image P1 is displayed such that the continuous paper S is wound around the transport roller 513 from the lower side thereof (i.e., the far side of FIG. 8B) to the upper side (i.e., the near side of FIG. 8B) thereof, and the traveling direction of the continuous paper S is subsequently changed by 90° so as to be guided leftward, as shown in FIG. 8B.

In a case where setting information indicating that the width of the continuous paper S used in image formation is "full width" is received as the device-status-related setting information, the guide image P1 shown in FIG. 8C is displayed. Specifically, in the case where the width of the continuous paper S is the full width, the guide image P1 is displayed such that the continuous paper S is extended below the transport roller 513 (i.e., at the far side of FIG. 8C) from right to left, as shown in FIG. 8C.

Accordingly, in this exemplary embodiment, the image displayed on the display sections 73 is changed in accordance with the device-status-related setting information received from the print server 3. Thus, the operator performing the operation for loading the continuous paper S into the image forming apparatus 5 may perform the operation while referring to the image displayed on the display sections 73 of the wearable terminal 7 even when, for example, not referring to a manual. As a result, even with a complicated operation, such as the loading operation of the continuous paper S, the operation may be performed readily, as compared with a case where this configuration is not employed. In addition, by performing the operation while referring to the image displayed in accordance with the device-status-related setting information received from the print server 3, an erroneous operation in the image forming apparatus 5 may be reduced.

In the examples shown in FIGS. 8A to 8C, the image displayed on the display sections 73 is changed in accordance with the width of the continuous paper S as the device-status-related setting information. Alternatively, for example, the image displayed on the display sections 73 may be changed in accordance with a combination of multiple pieces of device-status-related setting information.

This exemplary embodiment may achieve reduced traffic and increased speed when generating an assistance image (AR image) to be displayed on the display sections 73.

When displaying the assistance image, image data (i.e., an original image serving as a source of the assistance image) is generated by combining image data (including a three-dimensional model, such as polygonal data, and icon data) and font data. Moreover, in addition to the image data and the font data, information (image-formation-related information), such as the setting information of the image forming apparatus 5 and the setting information of a print job to be output from the image forming apparatus 5, is used.

Meanwhile, when these images and information are managed by being distributed to multiple devices, the communication traffic increases. Moreover, the intervention of communication leads to lower image-generating speed.

In contrast, in this exemplary embodiment of the present invention, information, such as the image data and the font data for generating the assistance image as well as the setting information of the print job, is temporarily stored in the print server 3, and these pieces of information are centrally managed. Thus, reduction in the communication traffic and reduction in the image-generating speed caused by communication are suppressed. In other words, traffic may be reduced or the processing time may be shortened, as compared with a case where the assistance-image-related information is managed by multiple devices connected to one another via a network. The term "network" refers to a common network, such as the Internet or an intranet, but does not include communication via a dedicated connection line.

As shown in FIG. 8A described above, the error-related information is displayed on the display sections 73 of the wearable terminal 7 as the setting-information image P2 related to an operation of the unit. In the image forming system 1 according to this exemplary embodiment, when an error occurs in the image forming apparatus 5 and the error-related information is displayed as the setting-information image P2 on the display sections 73 of the wearable terminal 7, the error may be removed in accordance with an operation performed on the operation receiving section 74 (see FIG. 4) by the operator.

Figure 9A:
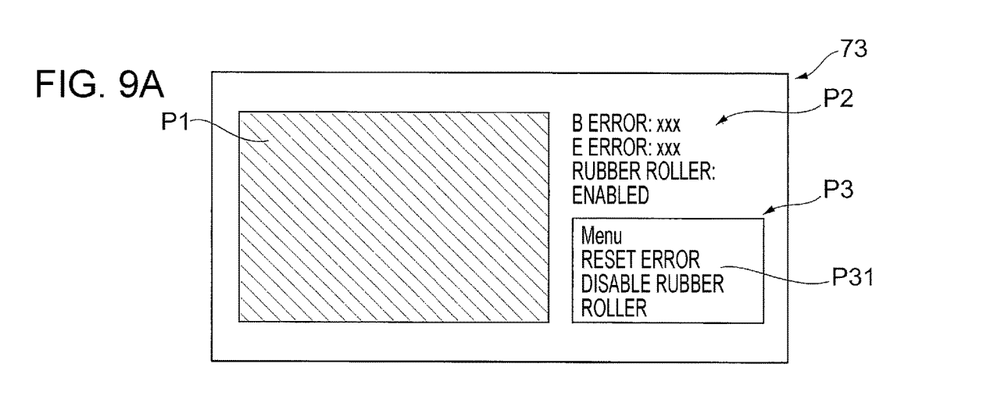
FIGS. 9A to 9C illustrate examples of images displayed on the display sections of the wearable terminal when an error occurs in the image forming apparatus.
Figure 9B:
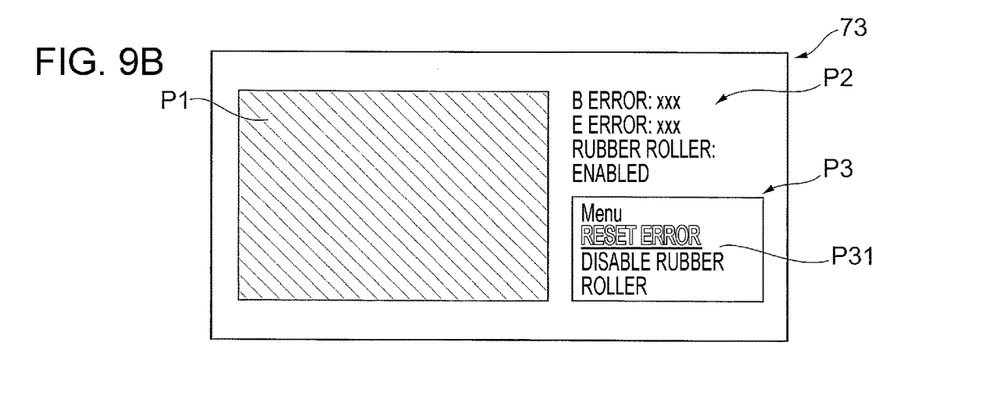
Figure 9C:
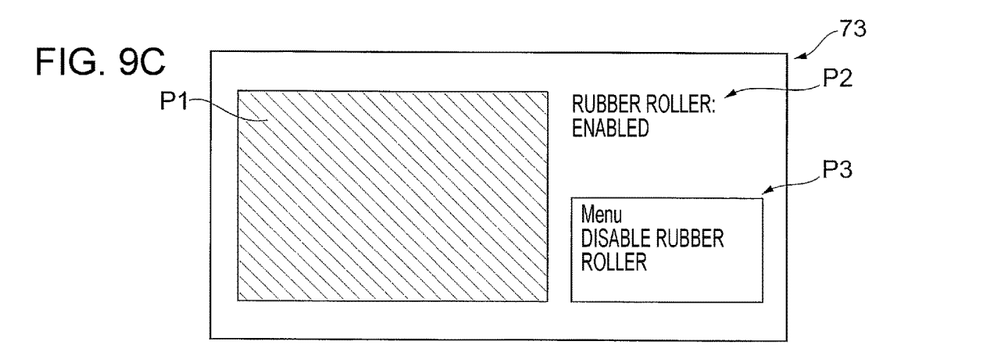

FIGS. 9A to 9C illustrate examples of images displayed on the display sections 73 of the wearable terminal 7 when an error occurs in the image forming apparatus 5. Specifically, FIGS. 9A to 9C illustrate examples of assistance images generated by the image generating unit 85 in step S108 described above and displayed on the display sections 73 by the display controller 87 in step S109.

In the example shown in FIG. 9A, the aforementioned guide image P1 and the setting-information image P2 related to an operation of the unit are displayed as assistance images for assisting with the operation performed by the operator. Furthermore, in the example shown in FIG. 9A, an operation menu image P3 operable by the operator is also displayed.

In this example, B error and E error have occurred in the image forming apparatus 5. As shown in FIGS. 9A, B error information and E error information are displayed as the setting-information image P2 based on the device-status-related setting information received in step S107 described above. Moreover, as shown in FIG. 9A, a reset section P31 for resetting the errors is displayed as the operation menu image P3.

In this exemplary embodiment, when B error and E error that have occurred in the image forming apparatus 5 are physically removed based on an operation performed on the image forming apparatus 5 by the operator, the reset section P31 in the operation menu image P3 becomes selectable, as shown in FIG. 9B.

When the reset section P31 is selected based on an operation performed on the operation receiving section 74 by the operator, B error and E error are removed. Specifically, the communication controller 89 in the controller 80 of the wearable terminal 7 provides an error-removal-related notification to the print server 3. Thus, B-error-related information and E-error-related information in the device-status-related setting information stored in the information storage unit 35 of the print server 3 are updated. As a result, B error and E error in the image forming apparatus 5 are removed.

When B error and E error in the image forming apparatus 5 are removed and the device-status-related setting information is updated, the image displayed on the display sections 73 of the wearable terminal 7 is changed accordingly.

Specifically, as shown in FIG. 9C, the B error item and the E error item previously displayed as the setting-information image P2 are deleted. Moreover, the reset section P31 item is deleted from the operation menu image P3.

Accordingly, in the image forming system 1 according to this exemplary embodiment, when an error occurs in the operation of the image forming apparatus 5, the error may be removed based on an operation performed on the wearable terminal 7. Thus, for example, it is not necessary to perform an error removing operation using the display panel 56 of the image forming apparatus 5 after the error is physically removed in the image forming apparatus 5. Consequently, this may allow for reduced wasteful movement of the operator and may achieve improved ease of operation of the image forming apparatus 5.

In the wearable terminal 7 according to this exemplary embodiment, the guide image P1 is displayed on the display sections 73 to overlap the view visually recognized through the lens sections 71 by the operator wearing the wearable terminal 7 based on control by the display controller 87. Alternatively, for example, the image (actual image) of the view captured by the image capturing section 72 may be displayed on the display sections 73, and the aforementioned guide image P1 may be displayed over the actual image displayed on the display sections 73.

Furthermore, in the wearable terminal 7 according to this exemplary embodiment, a mark M image-captured by the image capturing section 72 is detected, and a unit in the image forming apparatus 5 is specified based on the detected mark M. Alternatively, a mark M does not necessarily have to be used for specifying a unit in the image forming apparatus 5. Specifically, a unit of the image forming apparatus 5 may be specified by pattern-analyzing the position and size of each component and the continuous paper S using the moving image of the unit of the image forming apparatus 5 captured by the image capturing section 72.

Furthermore, although the image to be displayed on the display sections 73 of the wearable terminal 7 is composed by the controller 80 of the wearable terminal 7 in this exemplary embodiment, for example, the image may be composed by the print server 3, and the composed image may be output to the wearable terminal 7.

With regard to other processes, some or all of the processes performed by the controller 80 of the wearable terminal 7 may be performed in the print server 3. In other words, in this exemplary embodiment, the controller 80 of the wearable terminal 7 may constitute an information processing device, the print server 3 may constitute an information processing device, or both the controller 80 of the wearable terminal 7 and the print server 3 may constitute an information processing device.

Furthermore, in this exemplary embodiment, the wearable terminal 7 worn and used by the operator is described as an example of a portable terminal displaying an image, such as an assistance image. Alternatively, the portable terminal may be, for example, a smartphone, a portable telephone, a tablet terminal, or a digital camera in place of the wearable terminal 7 so long as the portable terminal is, for example, a medium that is equipped with the display sections 73 displaying an image and the image capturing section 72 capturing a moving image and that is worn by the operator for operating the image forming apparatus 5.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device for providing assistance to a user to perform an operation on an image forming apparatus that forms an image, the image processing device comprising:

a storage that stores image-formation-related information of the image forming apparatus, the image forming apparatus including a plurality of operational units; and a central processing unit (CPU) executing a program to cause a display of a portable terminal having the display and a camera to display an image for assisting with the operation of the image forming apparatus based on a mark detected in a captured image result of the camera and the stored image-formation-related information, the mark specifying an operational unit of the plurality of operational units of the image forming apparatus.

2. The information processing device according to claim 1, wherein the storage stores setting information and operational information as the image-formation-related information, the setting information being set for the image forming apparatus, the operational information being related to an image forming operation performed in the image forming apparatus, and wherein the CPU further executes the program to cause the display of the portable terminal to display the image based on the captured image result, the setting information, and the operational information.

3. The information processing device according to claim 1, wherein the CPU further executes the program to acquire the image-formation-related information from the image forming apparatus when an image of the image forming apparatus is captured by the camera of the portable terminal, and wherein the storage stores the image-formation-related information acquired.

4. The information processing device according to claim 1, wherein the wherein the CPU further executes the program to cause the display to display the image for assisting with the operation of the image forming apparatus and an image related to a device setting set in the image forming apparatus.

5. The information processing device according to claim 1, wherein the image for assisting with the operation of the image forming apparatus provides operational guidance to a user for performing the operation in the specified operational unit.

6. A portable terminal for providing assistance to a user to perform an operation on an image forming apparatus that forms an image, the portable terminal comprising:

a central processing unit (CPU) executing a program to communicate with a control device, which has a storage that stores image-formation-related information of the forming apparatus, the image forming apparatus including a plurality of operational units;

a display; and a camera, wherein the display displays an image for assisting with an operation of the image forming apparatus based on a mark detected in a captured image result of the camera and the image-formation-related information stored in the storage, the mark specifying an operational unit of the plurality of operational units of the image forming apparatus.

7. A control device for providing assistance to a user to perform an operation on an image forming apparatus, the control device comprising:

a central processing unit (CPU) executing a program to communicate with a portable terminal having a camera and a display; and a storage that stores image-formation-related information of the image forming apparatus, the image forming apparatus including a plurality of operational units;

wherein the CPU further executes the program to receive a captured image result of the camera and transmits information for assisting with an operation of the image forming apparatus, the information being generated based on a mark detected in the captured image result and the image-formation-related information stored in the storage, the mark specifying an operational unit of the plurality of operational units of the image forming apparatus.

8. A non-transitory computer readable medium storing a program causing a computer to execute a process for providing assistance to a user to perform an operation on an image forming apparatus that forms an image, the process comprising:

storing image-formation-related information of the image forming apparatus, the image forming apparatus including a plurality of operational units; and causing a display of a portable terminal having the display and a camera to display an image for assisting with an operation of the image forming apparatus based on a mark detected in a captured image result of the camera and the stored image-formation-related information, the mark specifying an operational unit of the plurality of operational units of the image forming apparatus.

* * * * *